(12) United States Patent
Nickel

(10) Patent No.: US 6,751,256 B1
(45) Date of Patent: Jun. 15, 2004

(54) TRANSMISSION OF DIGITAL IMAGES WITHIN THE NTSC ANALOG FORMAT

(75) Inventor: George H. Nickel, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 618 days.

(21) Appl. No.: 09/714,723

(22) Filed: Nov. 15, 2000

(51) Int. Cl.$^7$ .............................. H04N 7/12; H04N 7/01; H04N 11/20
(52) U.S. Cl. .................. 375/240.01; 348/448; 348/457
(58) Field of Search ...................... 375/240.01, 240.25, 375/240.03, 240.18; 348/426, 428.1, 432.1, 430.1, 437.1, 448, 458, 554, 457; 398/110; 386/26

(56) References Cited

U.S. PATENT DOCUMENTS

| | | | | |
|---|---|---|---|---|
| 4,476,484 A | * | 10/1984 | Haskell | 348/437.1 |
| 4,589,012 A | * | 5/1986 | Songer | 348/428.1 |
| 4,622,578 A | | 11/1986 | Rzeszewski | 358/12 |
| 4,912,525 A | * | 3/1990 | Pinoow | 398/110 |
| 5,010,405 A | | 4/1991 | Schreiber et al. | 358/141 |
| 5,077,616 A | * | 12/1991 | Kluth | 386/26 |
| 5,136,380 A | | 8/1992 | Cho | 358/141 |
| 5,161,006 A | | 11/1992 | Monta et al. | 358/31 |
| 5,204,745 A | | 4/1993 | Kawai et al. | 358/140 |
| 5,231,491 A | | 7/1993 | Holoch | 358/141 |
| 5,247,351 A | | 9/1993 | Cho | 358/11 |
| 5,461,427 A | | 10/1995 | Duffield | 348/555 |
| 5,485,217 A | | 1/1996 | Park | 348/445 |
| 5,504,530 A | | 4/1996 | Obikane et al. | 348/413 |
| 5,532,748 A | | 7/1996 | Naimpally | 348/432 |
| 5,592,230 A | | 1/1997 | Yoshino | 348/448 |

OTHER PUBLICATIONS

Bloomfield, "Television Goes Digital," Physics Today, pp. 42–47, Nov. 1999.

* cited by examiner

Primary Examiner—Gims Philippe
(74) Attorney, Agent, or Firm—Ray G. Wilson

(57) ABSTRACT

HDTV and NTSC compatible image communication is done in a single NTSC channel bandwidth. Luminance and chrominance image data of a scene to be transmitted is obtained. The image data is quantized and digitally encoded to form digital image data in HDTV transmission format having low-resolution terms and high-resolution terms. The low-resolution digital image data terms are transformed to a voltage signal corresponding to NTSC color subcarrier modulation with retrace blanking and color bursts to form a NTSC video signal. The NTSC video signal and the high-resolution digital image data terms are then transmitted in a composite NTSC video transmission. In a NTSC receiver, the NTSC video signal is processed directly to display the scene. In a HDTV receiver, the NTSC video signal is processed to invert the color subcarrier modulation to recover the low-resolution terms, where the recovered low-resolution terms are combined with the high-resolution terms to reconstruct the scene in a high definition format.

14 Claims, 6 Drawing Sheets

$$\begin{bmatrix} Y^*{}_{rc} \\ Y^*{}_{r+1c} \\ Y^*{}_{rc+1} \\ Y^*{}_{r+1c+1} \end{bmatrix} = \begin{bmatrix} \frac{1}{8} & \frac{\cos(\pi/4)}{\sqrt{32}} & \frac{\cos(\pi/8)}{\sqrt{32}} & \frac{\cos(\pi/4)\cos(\pi/8)}{4} \\ \frac{1}{8} & \frac{\cos(3\pi/4)}{\sqrt{32}} & \frac{\cos(\pi/8)}{\sqrt{32}} & \frac{\cos(3\pi/4)\cos(\pi/8)}{4} \\ \frac{1}{8} & \frac{\cos(\pi/4)}{\sqrt{32}} & \frac{\cos(5\pi/8)}{\sqrt{32}} & \frac{\cos(\pi/4)\cos(5\pi/8)}{4} \\ \frac{1}{8} & \frac{\cos(3\pi/4)}{\sqrt{32}} & \frac{\cos(5\pi/8)}{\sqrt{32}} & \frac{\cos(3\pi/4)\cos(5\pi/8)}{4} \end{bmatrix} \begin{bmatrix} \Psi_1 \\ \Psi_2 \\ \Psi_3 \\ \Psi_5 \end{bmatrix}$$

FIG. 2

$$\begin{bmatrix} I^*{}_{rc} \\ I^*{}_{r+1c} \\ I^*{}_{rc+1} \\ I^*{}_{rc+2} \\ I^*{}_{r+1c+2} \\ I^*{}_{rc+3} \end{bmatrix} = \begin{bmatrix} \frac{1}{8} & \frac{\cos(\pi/6)}{4\sqrt{2}} & \frac{\cos(\pi/16)}{4\sqrt{2}} & \frac{\cos(\pi/8)}{4\sqrt{2}} & \frac{\cos(\pi/6)\cos(\pi/16)}{4} & \frac{\cos(\pi/3)}{4\sqrt{2}} \\ \frac{1}{8} & -\frac{\cos(\pi/6)}{4\sqrt{2}} & \frac{\cos(\pi/16)}{4\sqrt{2}} & \frac{\cos(\pi/8)}{4\sqrt{2}} & -\frac{\cos(\pi/6)\cos(\pi/16)}{4} & \frac{\cos(\pi/3)}{4\sqrt{2}} \\ \frac{1}{8} & 0 & \frac{\cos(5\pi/16)}{4\sqrt{2}} & \frac{\cos(5\pi/8)}{4\sqrt{2}} & 0 & \frac{1}{4\sqrt{2}} \\ \frac{1}{8} & \frac{\cos(\pi/6)}{4\sqrt{2}} & \frac{\cos(9\pi/16)}{4\sqrt{2}} & -\frac{\cos(\pi/8)}{4\sqrt{2}} & \frac{\cos(\pi/6)\cos(9\pi/16)}{4} & \frac{\cos(\pi/3)}{4\sqrt{2}} \\ \frac{1}{8} & -\frac{\cos(\pi/6)}{4\sqrt{2}} & \frac{\cos(9\pi/16)}{4\sqrt{2}} & -\frac{\cos(\pi/8)}{4\sqrt{2}} & -\frac{\cos(\pi/6)\cos(9\pi/16)}{4} & \frac{\cos(\pi/3)}{4\sqrt{2}} \\ \frac{1}{8} & 0 & \frac{\cos(13\pi/16)}{4\sqrt{2}} & -\frac{\cos(5\pi/8)}{4\sqrt{2}} & 0 & \frac{1}{4\sqrt{2}} \end{bmatrix} \begin{bmatrix} \Phi_0 \\ \Phi_1 \\ \Phi_2 \\ \Phi_3 \\ \Phi_4 \\ \Phi_5 \end{bmatrix}$$

FIG. 3

$$\begin{bmatrix} I^*{}_{r+2c} \\ I^*{}_{r+1c+1} \\ I^*{}_{r+2c+1} \\ I^*{}_{r+2c+2} \\ I^*{}_{r+1c+3} \\ I^*{}_{r+2c+3} \end{bmatrix} = \begin{bmatrix} \frac{1}{8} & 0 & \frac{\cos(\pi/16)}{4\sqrt{2}} & \frac{\cos(\pi/8)}{4\sqrt{2}} & 0 & \frac{1}{4\sqrt{2}} \\ \frac{1}{8} & \frac{\cos(\pi/6)}{4\sqrt{2}} & \frac{\cos(5\pi/16)}{4\sqrt{2}} & \frac{\cos(5\pi/8)}{4\sqrt{2}} & \frac{\cos(\pi/6)\cos(5\pi/16)}{4} & \frac{\cos(\pi/3)}{4\sqrt{2}} \\ \frac{1}{8} & -\frac{\cos(\pi/6)}{4\sqrt{2}} & \frac{\cos(5\pi/16)}{4\sqrt{2}} & \frac{\cos(5\pi/8)}{4\sqrt{2}} & -\frac{\cos(\pi/6)\cos(5\pi/16)}{4} & \frac{\cos(\pi/3)}{4\sqrt{2}} \\ \frac{1}{8} & 0 & \frac{\cos(9\pi/16)}{4\sqrt{2}} & -\frac{\cos(\pi/8)}{4\sqrt{2}} & 0 & \frac{1}{4\sqrt{2}} \\ \frac{1}{8} & \frac{\cos(\pi/6)}{4\sqrt{2}} & \frac{\cos(13\pi/16)}{4\sqrt{2}} & -\frac{\cos(5\pi/8)}{4\sqrt{2}} & \frac{\cos(\pi/6)\cos(13\pi/16)}{4} & \frac{\cos(\pi/3)}{4\sqrt{2}} \\ \frac{1}{8} & -\frac{\cos(\pi/6)}{4\sqrt{2}} & \frac{\cos(13\pi/16)}{4\sqrt{2}} & -\frac{\cos(5\pi/8)}{4\sqrt{2}} & -\frac{\cos(\pi/6)\cos(13\pi/16)}{4} & \frac{\cos(\pi/3)}{4\sqrt{2}} \end{bmatrix} \begin{bmatrix} \Phi_0 \\ \Phi_1 \\ \Phi_2 \\ \Phi_3 \\ \Phi_4 \\ \Phi_5 \end{bmatrix}$$

FIG. 4

$$\begin{bmatrix} Q^*{}_{rc} \\ Q^*{}_{rc+2} \end{bmatrix} = \begin{bmatrix} \frac{1}{8} & \frac{\cos(\pi/16)}{4\sqrt{2}} \\ \frac{1}{8} & \frac{\cos(9\pi/16)}{4\sqrt{2}} \end{bmatrix} \begin{bmatrix} \Theta_1 \\ \Theta_3 \end{bmatrix}$$

$$\begin{bmatrix} Q^*{}_{rc+1} \\ Q^*{}_{rc+3} \end{bmatrix} = \begin{bmatrix} \frac{1}{8} & \frac{\cos(5\pi/16)}{4\sqrt{2}} \\ \frac{1}{8} & \frac{\cos(13\pi/16)}{4\sqrt{2}} \end{bmatrix} \begin{bmatrix} \Theta_1 \\ \Theta_3 \end{bmatrix}$$

FIG. 5

$$TM = \begin{bmatrix} 111111 & 000000 & 000000 & 000000 & 000000 & 000000 & 000000 & 000000 & 000000 \\ 000000 & 111111 & 000000 & 000000 & 000000 & 000000 & 000000 & 000000 & 000000 \\ 000000 & 000000 & 111111 & 000000 & 000000 & 000000 & 000000 & 000000 & 000000 \\ 000000 & 000000 & 000000 & 111111 & 000000 & 000000 & 000000 & 000000 & 000000 \\ 000000 & 000000 & 000000 & 000000 & 111111 & 000000 & 000000 & 000000 & 000000 \\ 000000 & 000000 & 000000 & 000000 & 000000 & 111111 & 000000 & 000000 & 000000 \\ 000000 & 000000 & 000000 & 000000 & 000000 & 000000 & 111111 & 000000 & 000000 \\ 000000 & 000000 & 000000 & 000000 & 000000 & 000000 & 000000 & 111111 & 000000 \\ 000000 & 000000 & 000000 & 000000 & 000000 & 000000 & 000000 & 000000 & 111111 \\ \{\cos((455\pi/2084)j + 11/60)\} & \{\cos((455\pi/2084)j + 11/60)\} & \{\cos((455\pi/2084)j + 11/60)\} \\ \{\cos((455\pi/2084)j + 11/60)\} & \{\cos((455\pi/2084)j + 11/60)\} & \{\cos((455\pi/2084)j + 11/60)\} \\ \{\cos((455\pi/2084)j + 11/60)\} & \{\cos((455\pi/2084)j + 11/60)\} & \{\cos((455\pi/2084)j + 11/60)\} \\ \{\sin((455\pi/2084)j + 11/60)\} \end{bmatrix}$$

FIG. 9

TRANSMISSION OF DIGITAL IMAGES WITHIN THE NTSC ANALOG FORMAT

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to high definition color television (HDTV), and, more particularly, to HDTV that is compatible with existing television receivers using the format developed by the National Television Systems Committee (NTSC).

BACKGROUND OF THE INVENTION

Current television receivers, referred to as "NTSC" for National Television Systems Committee, are analog devices originally developed in the 1930's for transmission of black and white images. The system uses interlacing of lines in frames, a complex arrangement for synchronization of the horizontal and vertical retraces, and allocates a portion of the signal voltage range for blanking during retrace. When color was incorporated in the 1950's, sophisticated subcarrier modulation techniques were added, along with accommodations to the human visual response that allowed the new chrominance data to fit within the earlier format. Although simple in principle, NTSC television is actually very detailed in practice, and represents a generally under-appreciated triumph of electronics technology. (Appendix A contains a very brief summary of the pertinent NTSC parameters, and Reference 1 gives extensive details.)

In HDTV, a picture is converted into digital data and compressed, like files on a computer. One part of the compression process also is used under the NTSC format where the data is split into luminance data (black and white fine detail information) and two components of chrominance (color) data, which require far less detail. In the HDTV system, the picture is further transformed into another "space" where the files can be compressed very efficiently. At this time, the compression system is the Joint Photographics Experts Group (JPEG) system (or its moving picture variation, MPEG), which is used in conventional computers for picture compression.

HDTV systems are modern digital computers that use information theoretic methods to transmit and receive the digitized image data efficiently (see Reference 2 for the Discrete Cosine Transform (DCT)-based standard, References 3 and 4 for information-theoretic methods). DCT transformations also exploit features of the human visual response to minimize the number of bits required for transmission of color images, which are perceived with nearly the same quality as the original image. The visual features that are used include persistence of vision, spatial resolution of different color components, and the contrast threshold limits needed to distinguish brightness variations at different spatial wavelengths.

The last of these features naturally leads to a transformation of blocks of pixels from brightness values to coefficients of basis functions of some appropriate form, such as DCT, other trigonometric functions, or wavelets. These coefficients are then "quantized", or grouped into bins spanning a range of values, so that the entropy of the resulting set of coefficients is small enough for the information to be accommodated by the channel. This quantization step is noninvertible, or lossy, but generally provides the largest single contribution to the image compression. Further image compression is obtained by using entropy coding to reduce the number of bits to be transmitted, nearly reaching the fundamental limits on the channel capacity as determined by bandwidth and noise (Reference 3). The most efficiently encoded signals reach the highest entropy rate attainable; that is, they resemble gaussian random noise. The HDTV receiver samples the waveform digitally, corrects for errors, inverts the entropy coding and mathematical transformations, and displays the resulting image. If such signals were presented to an NTSC television receiver, they would appear as "snow". (Reference 5 gives an excellent overview of NTSC and HDTV systems.)

During the interim period when existing NTSC receivers are still abundant, some method is needed to allow new programming in HDTV format to be seen also on NTSC receivers. Digital-to-NTSC converters were proposed at one time, and the current approach is the simultaneous broadcasting of an additional channel that contains the NTSC signal. It is desirable, however to minimize the amount of bandwidth that must be utilized for HDTV. It is a purpose of the present invention to provide HDTV transmission within a single 6 MHz channel and in a format that is readily usable by either a NTSC receiver or a HDTV receiver.

As more fully explained below, the present invention uses an alternate scheme to compress the luminance and chrominance data. Only high resolution details are compressed digitally, as described above for HDTVs; the remaining low resolution details are transmitted in the NTSC format. NTSC receivers lose very little picture quality since the finer details are not discernible to the human eye in an analog TV. To be fully compatible with the NTSC format, additional "bookkeeping" information is added, such as a color burst to synchronize the reception of the color data and the synchronization pulses that trigger line sweeps. There is also some "dead time" when the electron beam is moving back to start a new line. However, there is increased compression when digital data is separated into two or more components, which partially offsets these channel capacity losses. The result is that a single channel can be used to transmit the combined signal with little loss in HDTV picture detail.

In an NTSC receiver, in the exemplary process herein, about half the extra digital information containing the finer details are seen in "letterbox" bounding lines that may be displayed above and below the wider format picture produced under the HDTV format. In the examples presented here, the letterbox lines are not black, but rather a rather uniform gray since they are replaced every $60^{th}$ of a second. The other half is sent in the vestigial video sideband that is not currently used by NTSC transmitters. However, conventional NTSC transmitters can be readily modified to use the vestigial sideband. The NTSC receivers will not use this data at all since it is sent in quadrature with the carrier wave for the video signal and is not processed by simple amplitude modulation detectors.

The new HDTV receivers can be readily modified to accept the combined signal since only a software change is needed to accept the combined data. The low resolution data sent in NTSC format is converted to digital form and combined with the finer detail data to form the complete image that is displayed by the HDTV receiver.

Various advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention includes a method for HDTV and NTSC compatible image processing. Luminance and chrominance image data of a scene to be transmitted is obtained. The image data is quantized and digitally encoded to form digital image data in HDTV transmission format having low-resolution terms and high-resolution terms. The low-resolution digital image data terms are transformed to a voltage signal corresponding to NTSC color subcarrier modulation with added retrace blanking and color bursts to form a NTSC video signal. The NTSC video signal and the high-resolution digital image data terms are then transmitted in a composite NTSC video transmission. In a NTSC receiver, the NTSC video signal is processed directly to display the scene. In a HDTV receiver, the NTSC video signal is processed to invert the color subcarrier modulation to recover the low-resolution terms, where the recovered low-resolution terms are combined with the high-resolution terms to reconstruct the scene in a high definition format.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 2 is a matrix for low-resolution luminance transformation for pixel blocks.

FIG. 3 is a matrix for low-resolution in-phase chrominance transformation for odd columns of macroblocks.

FIG. 4 is a matrix for low-resolution in-phase chrominance transformation for even columns of macroblocks.

FIG. 5 are matrices for low-resolution quadrature chrominance transformations for odd (upper) and even (lower) macroblock scans.

FIG. 9 is the digital subcarrier modulation matrix.

DETAILED DESCRIPTION

In accordance with the present invention, digital information is imbedded within the NTSC format so that both HDTV and NTSC signals are accommodated within the bandwidth of a single channel. The set of conventional HDTV quantized coefficients is partitioned into low-resolution and high-resolution components. The numbers of low-resolution coefficients for the luminance and chrominance components to form a HTSC compatible signal are chosen according to the bandwidths available in the NTSC format. The low-resolution components are linearly transformed back to the image space as a viewable image, and are not quantized or entropy-coded. The inefficiency that might be expected from this lack of entropy coding is small because: (1) there are relatively few coefficients in the low-resolution component; (2) the entropy of the low-resolution coefficients is high for most images so that entropy compression causes only a small decrease; (3) the entropy of the high-resolution component is very low for most images; and (4) an inequality associated with the entropy of partitioned data sets implies a reduction in the number of bits required when low and high resolution data are separated (see Reference 4). The high-resolution components are digitally encoded and transmitted in other portions of the signal, such as in "letterbox" lines bounding a higher aspect ratio image or the unused vestigial sideband arising from the amplitude modulated video signal.

Figure 1:
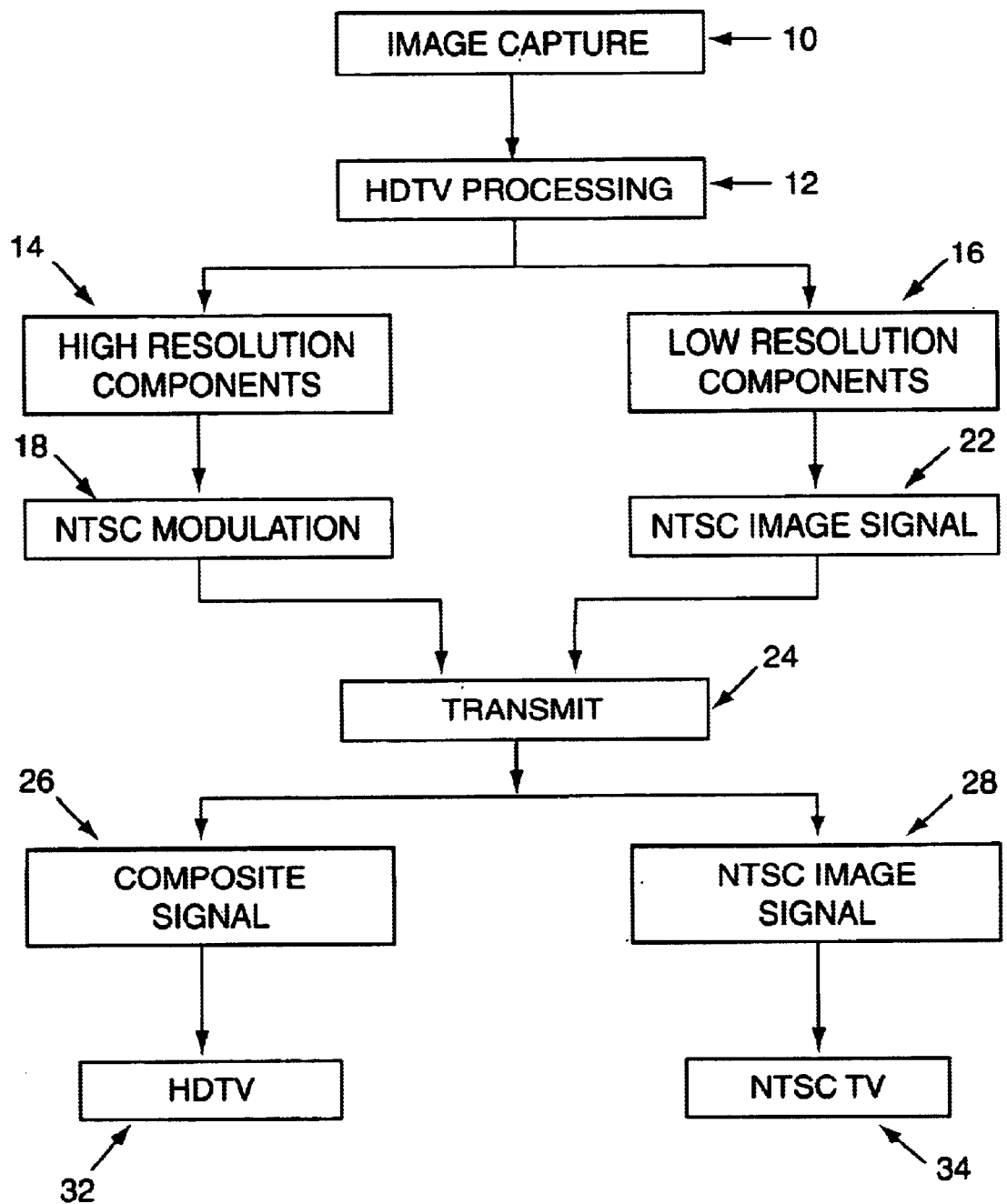
FIG. 1 is an overview flow diagram of a HDTV/NTSC compatible system using only a single NTSC channel bandwidth.

FIG. 1 presents an overview of the process of the present invention. An image is captured 10 and conventionally processed 12 as a HDTV signal. Now, however, the HDTV signal is separated into high resolution components 14 and low resolution components 16. The high resolution conventional HDTV components are directly used to modulate 18 portions of the NTSC signal that will not be processed for the NTSC image. A transformation is applied 22 to the low resolution conventional HDTV quantized coefficients to generate the NTSC-compatible signal.

The NTSC signal is transmitted 24 to both NTSC and HDTV receivers. The low resolution components in the NTSC compatible signal directly form the image on a NTSC receiver. In a HDTV receiver, according to the present invention, software digitally samples the NTSC waveform and inverts the added transformation to recover 28 the low resolution digital data. The high resolution digital data is recovered 26 directly from the modulated portions of the NTSC signal. The low resolution components are then processed with the high-resolution digital data and displayed 32 in the normal HDTV mode. No hardware modifications are required to create the high-definition image. The effects of these transformations result in a single 6 MHz channel to transmit an image that is directly viewable on NTSC receivers and invertible to an HDTV image with only a 20%–30% decrease in the image quality delivered by an HDTV receiver.

To illustrate the process, an image of 1280 by 720 pixels was chosen, with a frame rate of 60 Hz (actually 59.94 Hz). Other rates could be accommodated with interpolation. For this example, a complete high-definition image is transmitted in each NTSC half-frame. A doubling of the image quality of a single frame in bits/pixel can be obtained by using 30 Hz frame rates. The NTSC frame rate and video bandwidth translate to about 521 independent symbols per scan line, where a "symbol" is a digit in the numerical base used by a video channel. In a binary system (base 2), there are only two different symbols, 0 and 1, but digital transactions do not have to be in binary. The horizontal retrace blanking occupies 41 of these symbols, and the color burst another 24, leaving 456 symbols for the video information.

In conventional HDTV systems, and as used herein, luminance data are divided into 8×8 arrays of pixels, and the two chrominance components are each formed from 16×16 arrays of pixels where each chrominance value is an average of a corresponding 2×2 array of pixels. The resulting 8×8 arrays of chrominance components are "macroblocks". For a 720×1280 pixel image (a 16:9 aspect ratio), there are 90×160 blocks of luminance data (Y) and 45×80 macroblocks of each chrominance data (I,Q). Each block (or macroblock) is an array of 64 bytes of pixel brightness values in an 8×8 array, which are transformed into a corresponding array of DCT coefficients in accordance with the JPEG Standard (Reference 2 and Appendix C). The blocks and macroblocks are processed in horizontal raster scan order, beginning at the upper left corner of the image. Each DCT coefficient matrix is reshaped into a one-dimensional array using the "zigzag" pattern of the JPEG standard.

At this point in the process of the invention, the NTSC-compatible transformations are introduced. The amount of information that can be transmitted in the NTSC format is determined by the number of bits of data that can be used to represent each symbol. Broadcast signals are assumed to have a signal-to-noise ratio (S/N) corresponding to 3 bits/symbol (above the loss of 0.4 bits/symbol that is due to the restriction to 75% of the signal range). The NTSC format permits 456 symbols per scan line. The present invention uses 3 low resolution symbols to represent each block on each scan line. However, the full block array is 160 blocks per line across the width of the image, requiring 480 symbols per line.

To fit the image into the available number of symbols, two columns of macroblocks are deleted from the left and right edges of the NTSC image and their (difference-coded) coefficients are compressed digitally and transmitted with the high-resolution digital data (see below). Since 21 lines are used in the vertical retrace for a full frame, only 504 lines are considered for the transmission of video information, although some bits could be encoded in the "ultrablack" of these lines. The 252 remaining lines in each half-frame are partitioned into 180 image lines and 72 "letterbox" lines bounding the image and containing high resolution HDTV digital information.

Figure 6:
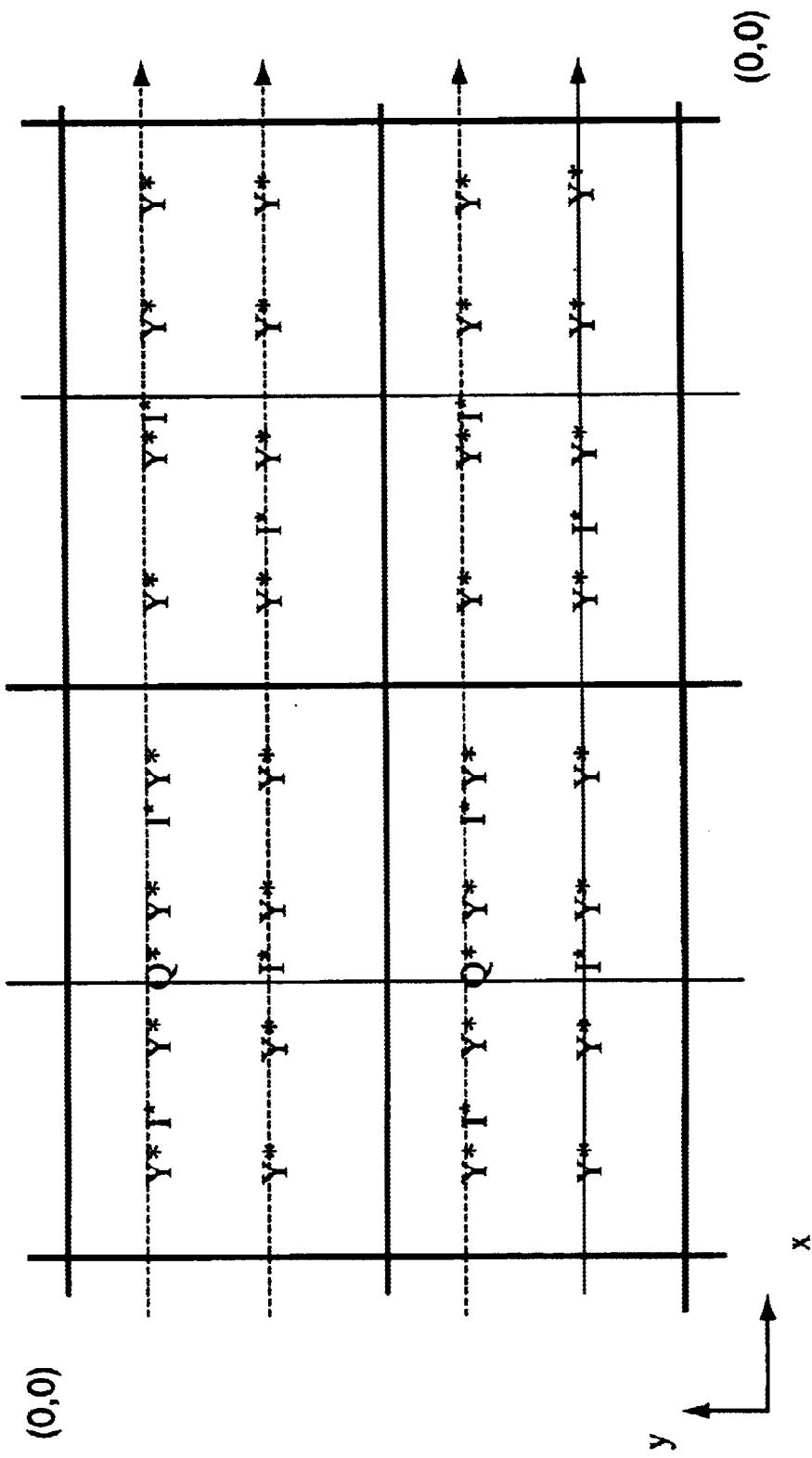
FIG. 6 schematically depicts the spatial distribution for each luminance and chrominance component for the transformation of low resolution DCT coefficients.

In conformance with the bandwidths available for luminance and chrominance data in the NTSC format, the $1^{st}$, $2^{nd}$, $3^{rd}$ and $5^{th}$ luminance $\Psi$ coefficients, the first 6 $\Phi$ coefficients, and the $1^{st}$ and $3^{rd}$ $\Theta$ coefficients from the one-dimensional DCT coefficient arrays (see Appendix C) are transformed back to the corresponding image space coefficients Y*, I*, and Q*, with the transformation matrices shown in FIGS. 2–5. A set of (x,y) coordinate patterns is established for the luminance (Y*) and each chrominance component (I* and Q*). An exemplary pattern is shown in FIG. 6. The coordinates are measured from an origin at the upper left corner of each block or macroblock, with x increasing to the right and y increasing in the downward direction. The lower right corner has coordinates (1,1).

FIG. 6 illustrates the pattern of points at an odd half-frame, for eight adjacent blocks (two macroblocks), the basic symmetry element of this transformation. Each luminance block is traversed by two lines. The "slant" of a line across each block or macroblock is ignored. Thus, the block y-coordinate values are ⅛ and ⅝ for odd NTSC half-frames, and ⅜ and ⅞ for even half-frames. Each macroblock is traversed by four line scans in a HDTV frame. The four y-coordinates are thus 1/16, 5/16, 9/16 and 13/16 for odd half-frames, and 3/16, 7/16, 11/16 and 15/16 for even half-frames.

The x-coordinates of the Y-components are centered at ¼ and ¾, and those of the Q-chrominance are at ½ and staggered in alternate macroblocks. The I-values are also staggered in alternate macroblocks, with two x-coordinates at ⅙ and ⅚ in one, and one at ½ in the other. In this way, a uniform spacing of each set of coefficients is achieved, and the transformation matrices (FIGS. 2–5) describing brightness values in terms of DCT coefficients are invertible. The leading luminance coefficients of each block, $\Psi^k_1$, where k is the block index, are transformed to luminance values $Y_{rc}$, where r and c are the row and column indices of upper left corner of the block. Interchanging the row and column indices in the equations gives the image in upright format.

Application of these matrix equations transforms the low-resolution components to "low-resolution images" (i.e., NTSC images) denoted Y*, I* and Q*. The final step is to convert these brightness values into a signal that combines the luminance and chrominance data using the NTSC subcarrier modulation scheme. From FIG. 6, it is seen that as each line crosses two macroblocks, there are 8 Y's, 3 I's and 1 Q. These are transformed into 12 "voltages" by the linear transformation TM in FIG. 9. (This transformation actually interpolates to give 48 voltages from 12 coefficient values, oversampling by a factor of four while introducing a minimum of frequency components outside of the 4.1 MHz video sideband.) This signal voltage, as a function of time, with added retrace blanking, color burst and digital data in the letterbox lines, represents the only source of information for NTSC receivers. A direct image of the voltage in raster form gives the picture that would be seen by a black-and-white receiver, and an approximate 3-point digital subcarrier detection algorithm shows the picture as seen on an NTSC receiver. The remaining coefficients, and any extra bits from the low-resolution component beyond what the transmission channel can accommodate, are sent in the letterbox lines and the vestigial channel.

Figure 7:
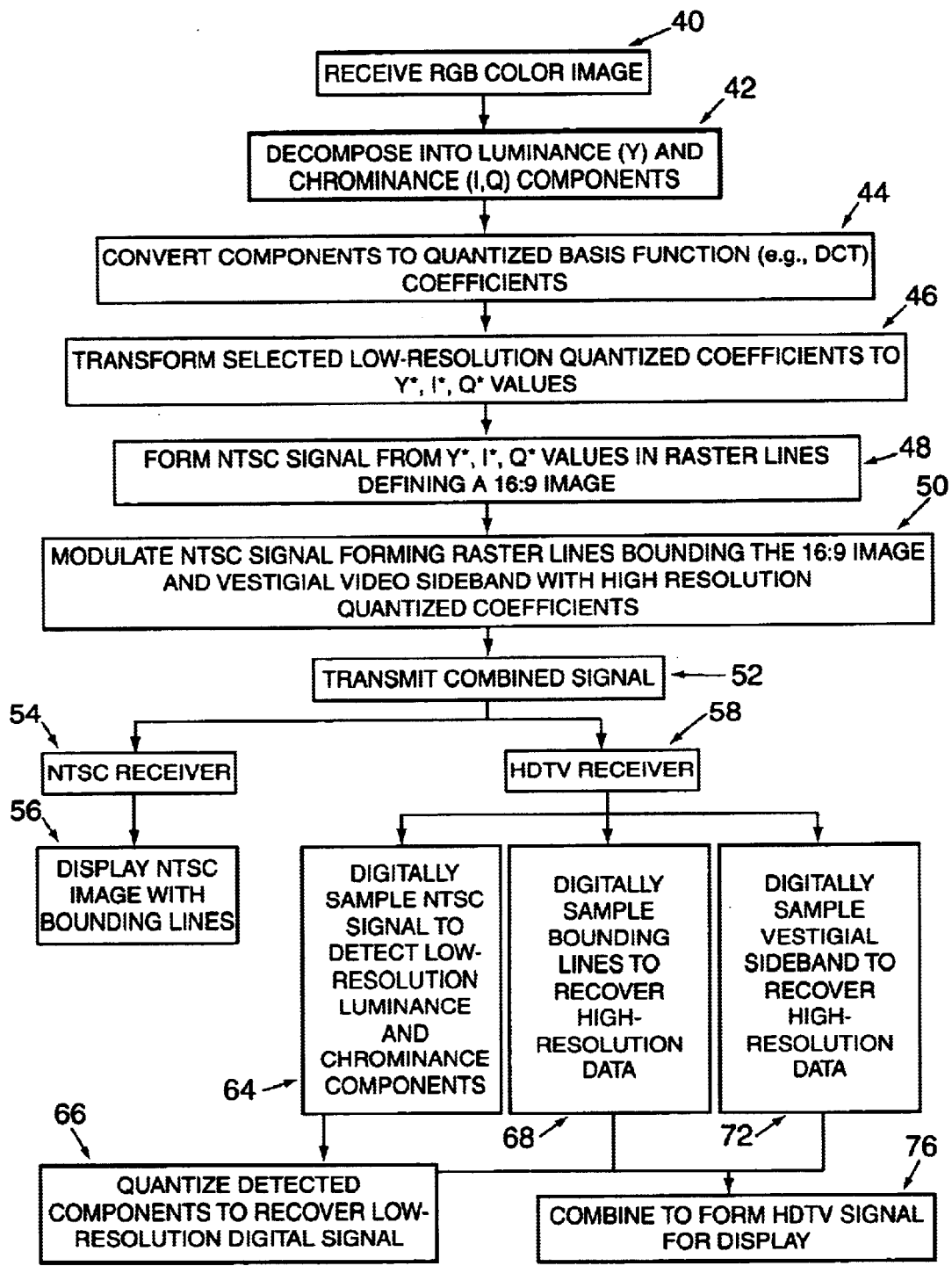
FIG. 7 is a flow diagram showing an exemplary process in accordance with the present invention.
Figure 8:
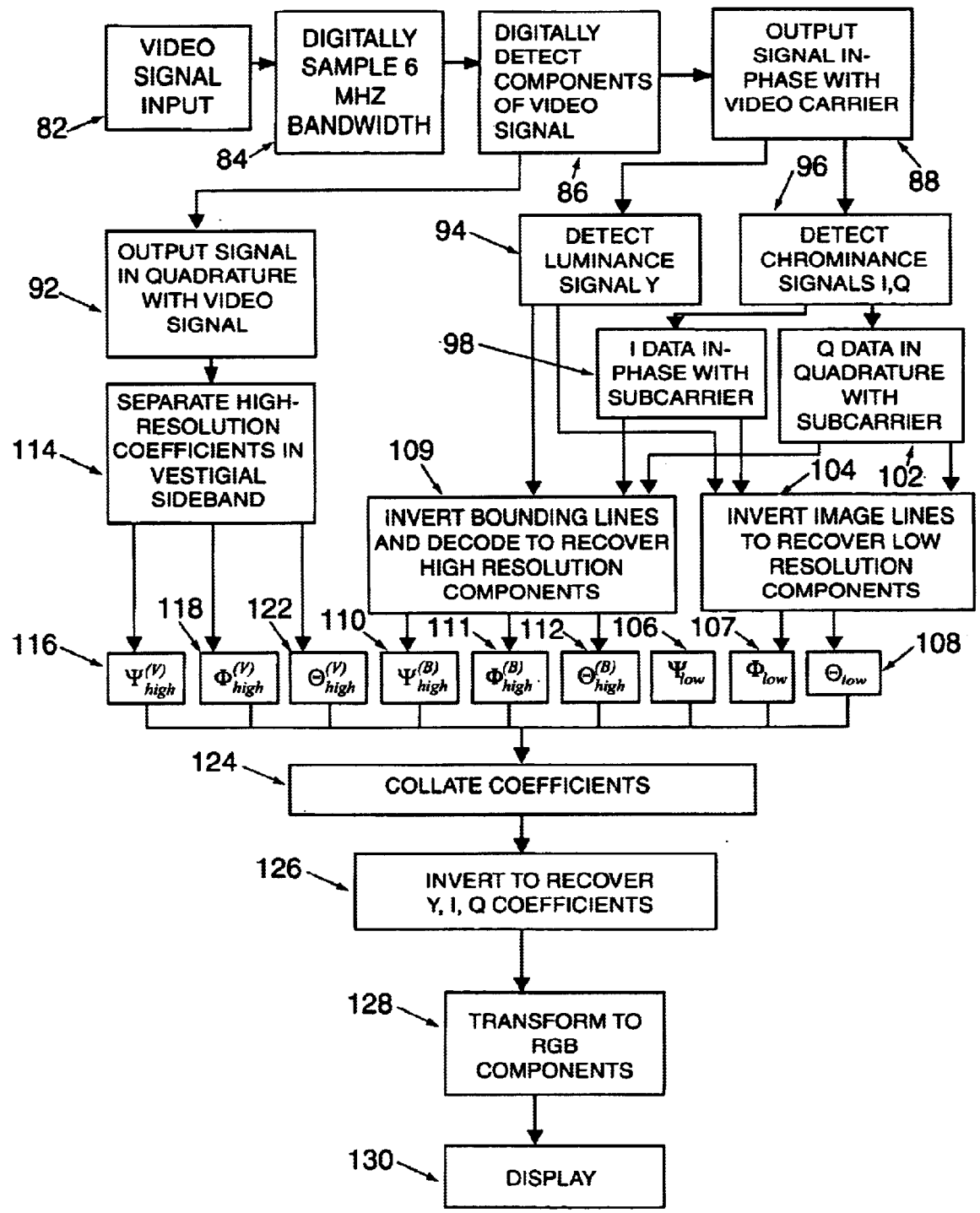
FIG. 8 is a flow diagram more particularly showing reconstruction of the HDTV data.

An exemplary process according to the present invention is shown in FIGS. 7 and 8. The original RGB (red-green-blue) image 40 is first decomposed 42 to luminance values Y and chrominance values I and Q for each pixel according to the NTSC relationship:

$$Y = .30R + .59G + .11B$$

$$I = .60R - .28G - .32B$$

$$Q = .21R - .52G + .31B$$

The coefficients of the basis function transforms, e.g., DCT transform, of the (Y,I,Q) components are computed 44; i.e., sequential 8×8 blocks of (Y, I, Q) are converted to basis function coefficients ($\Psi$, $\Phi$, $\Theta$). For conventional HDTV processing, the preferred basis function is the DCT transform, which will be exemplified herein. This should not be considered a limitation of the present invention except as specifically recited in the claims. In accordance with present HDTV methods, these coefficients are then quantized. Other color transformations are possible, but RGB to YIQ is preferable when interfacing with the NTSC standard.

In accordance with the present invention, low-resolution terms in the transformation of each luminance/chrominance component are linearly transformed 46 back to (Y*, I*,Q*) image space. The desired properties of these transformations are: that the resulting NTSC image be an accurate representation of the original image; that the relative information in the Y, I and Q values be in the proper proportion for the NTSC video bandwidths for the luminance and subcarrier signals; and that the transformations be easily invertible in the new software path for HDTV receivers. Because of the interlacing of scan lines in the NTSC format, there are separate transformations for even and odd frames.

The conditions cited above lead to the choice of 4 luminance values for each block, and the symmetry of the DCT basis functions indicates that the (00), (10), (01) and (11) coefcents be used, or the 1st, 2nd, 3rd, and 5th values of the "zigzag" ordering. The bandwidths of approximately 4 Mhz, 1.5 Mhz and 0.5 Mhz in the NTSC composite video for for Y, I, Q, respectively, imply that the 16 luminance values, Y, in each macroblock should be accompanied by the first 6 coefficients of the in-phase component, I, and 2 values of the quadrature component, Q. The odd number of chrominance components in each macroblock, together with uniformity of the density of points, leads to a further alternation of the patterns in adjacent macroblocks. Thus, the basic symmetry element of the transformation is a pair of macroblocks, with the centering of luminance and chrominance values indicated in FIG. 6 for an odd frame.

An appropriate distribution of luminance and chrominance symbols across successive scan lines is shown in FIG. 6. This pattern provides a uniform spatial distribution and leads to an invertible transformation. Evaluation of the DCT transformation basis functions at the coordinate values determined by these considerations leads to the matrices presented in FIGS. 2–5, which relate the chosen low resolution DCT coefficients to the NTSC scan line voltages. These voltages are combined using the standard NTSC subcarrier modulation system, and, with the added signals for horizontal and vertical synchronization, retrace blanking and color burst, give the transmitted signal in the central 180 lines of each half-frame.

These "NTSC-resolution image" values are then transformed 48 to a voltage signal using pulse code modulation that corresponds to the NTSC color subcarrier modulation with added retrace blanking and color bursts. An exemplary digital subcarrier modulation matrix is presented in FIG. 9 for use in displaying the resulting images generated by numerical simulations. Because this matrix is large, relating 12 luminance/chrominance values to 48 voltages in 4-to-1 oversampling, it is represented in symbolic form. The first 8 rows represent the repetition of 8 luminance values as the scan line traverses the two macroblocks of the basic symmetry element. The next 3 rows represent the equations for the subcarrier modulation of the 3 in-phase chrominance values (the constant $^{11}\!/_{60}$ in the argument of the cosines represents a rotation of 33 degrees in the NTSC modulation system). The last row, with the sine function, represents the quadrature chrominance values. The symbol j in these equations represents a cumulative index running from 261 (the first point following the retrace blanking and color burst) to 2084 (the oversampling factor times the number of independent symbols per scan line allowed by the video bandwidth). This matrix is only approximate, and is used to demonstrate the form of the voltage vs. time in the NTSC format. In practice, it will be necessary to modify the matrix by appropriate windowing factors to eliminate the possibility of out-of-bandwidth fourier components.

The number of coefficients taken for each component is chosen to be consistent with the NTSC bandwidths for Y, I and Q (8:3:1). The remaining higher order coefficients are quantized and encoded 50 by the standard methods of data compression and error correction for HDTV digital data and modulates the NTSC signal for transmission 52 with the NTSC signal as, e.g., letterbox boundary lines or in a vestigial video sideband. Since the vestigial video sideband is not used by a NTSC receiver, the data carried by the sideband can modulate the sideband by any efficient means, such as quadrature amplitude modulation.

At a NTSC receiver 54, the entire 6 MHz bandwidth is processed conventionally to separate the video information and to recover the audio data. The pulse amplitude modulated signal is simply processed as an analog signal. The resulting 4.1 MHz video "baseband" signal can be viewed directly 56, either as would be seen on an old black-and-white receiver, or demodulated to represent the color image shown by a current NTSC receiver.

In a HDTV receiver 58 with the software-implemented process of the present invention, the NTSC baseband signal is digitally processed to invert the chrominance subcarrier modulation. The NTSC signal is digitally sampled 64 to recover the luminance and chrominance components from the pulse amplitude modulated signal. The resulting digital image arrays for Y, I, and Q information are processed 66 with the inverse of the transformation matrices of FIGS. 2–5 to recover the spatial transform coefficients. Likewise, the letterbox lines are digitally sampled 68, as are the vestigial sidebands 72, to recover the high resolution information. Because the video carrier was not suppressed, it is available for synchronous detection of the video sidebands. After recombining 76 the low- and high-resolution coefficients, the high-definition image is reconstructed and displayed as in conventional HDTV receivers.

FIG. 8 more particularly depicts processing of the combined NTSC signal with both high and low resolution image data. The combined signal is input 82 to a HDTV receiver where the signal is sampled 84 over the entire 6 MHz bandwidth of the video signal. Data components of the video signal are digitally detected 86 to output 88 a signal in-phase with the video carrier and to output 92 a signal in quadrature with the video signal.

The in-phase output signal contains the low-resolution image information, which is first processed to detect 94 the luminance signal components Y and to detect 96 the chrominance signal components I, Q. The chrominance signal components are further processed to separate the data I 98 that is in-phase with the video subcarrier and the data Q 102 that is in quadrature with the video subcarrier. The Y, I, Q components in the image lines are then inverted 104 to recover the low-resolution digital coefficients $\Psi_{low}$ 106, $\Phi_{low}$ 107, and $\Theta_{low}$ 108. The Y, I, Q components in the bounding lines are also inverted 109 to recover the high-resolution digital coefficients $\Psi_{high}^{(B)}$ 110, $\Phi_{high}^{(B)}$ 111, and $\Theta_{high}^{(B)}$ 112.

The high resolution image data is contained in the quadrature video signal 92. The high resolution components in the vestigial sideband and the bounding lines are then recovered 114 to directly obtain $\Phi_{high}^{(V)}$ 116, $\Phi_{high}^{(V)}$ 118, and $\Theta_{high}^{(V)}$ 122 coefficients. The low and high resolution $\Psi$, $\Phi$, and $\Theta$ components are collated 124 and inverted 126 to recover the Y, I, and Q coefficients, respectively. The Y, I, and Q coefficients are transformed 128 to RGB space for display 138 of the original image on a HDTV screen.

In process step 104, the NTSC-compatible transformations of the low resolution coefficients (Y*, I*, Q*) are inverted back to the ($\Psi$, $\Phi$, $\Theta$) HDTV image space. These inversion transformations relate voltage values of the horizontal scan lines of the NTSC format, spatially distributed as shown in FIG. 6 over the luminance blocks and chrominance macroblocks.

The pseudoinverse of the matrix shown in FIG. 8 does exist, demonstrating that digital sampling of these scan lines can recover the original luminance/chrominance values. Because the inverses of the transformations in FIGS. 4–7 are also well-defined, the HDTV receiver can recover the low resolution DCT coefficients from the central 180 lines of each NTSC half-frame.

Numerical simulation using various images have verified: that the inversion of the low resolution NTSC image to recover the original DCT coefficients is practical; that the introduction of errors by noise in the channel is consistent with standard practice; and that the amount of information in the remaining high resolution DCT coefficients is consistent with the bandwidth available in the letterbox lines and the vestigial video sideband. Side-by-side comparisons of images transmitted by standard HDTV digital transmissions and this invention show only slight degradation in image quality.

REFERENCES (incorporated herein by reference):
(1) Radio Engineering Handbook, 5$^{th}$ Edition, Keith Henney, McGraw-Hill, New York 1959. See, e.g. Chapter 22, Television, Raymond F. Guy.
(2) JPEG Still Image Compression Standard, William B. Pennebaker and Joan L. Mitchell, Van Nostrand 1993, ISBN 0-442-01271-1. See also "The JPEG Still Picture Compression Standard", Gregory Wallace, IEEE Transactions on Consumer Electronics, Vol. 38, No. 1, February 1992, pp. xviii–xxxiv.
(3) Coding and Information Theory, Richard W. Hamming, Prentice-Hall 1986, ISBN 0-13-139072-4.
(4) "Information Theoretic Inequalities", Amir Dembo, Thomas Cover, and Joy Thomas, IEEE-Transactions on Information Theory, Vol 37, No. 6, November 1991, pp. 1501-1518.
(5) "Television Goes Digital", Physics Today, Louis A. Bloomfield, November 1999, pp 42–47.

APPENDIX A, NTSC STRUCTURE:

As mentioned above, the NTSC format is very complex. A brief overview is provided for convenience:

Bandwidths: The allotted 6 MHz channel is divided into two portions, an FM-modulated audio channel 0.5 MHz wide at the high end, and an AM-modulated video channel with an unsuppressed carrier 1.25 MHz above the low end. Coding of the audio channel is not addressed in this paper. Of the 4.25 MHz in the upper sideband, approximately 4.1 MHz is usable without interfering with the audio channel. The 1.25 MHz vestigial sideband is not used in NTSC, although synchronous detection is possible using the highly stable, unsuppressed AM carrier. The main 4.1 MHz video sideband is further divided by subcarrier modulation with a suppressed carrier approximately 3.6 MHz above the AM carrier. This subcarrier supports two sidebands in quadrature: the In-phase component 1 (1.5 MHz) and the Quadrature component Q (0.5 MHz). Actually, these components are "rotated" by 33° (11π/60 in FIG. 8) in NTSC for some historical reason.

Luminance data Y is contained in the entire 4.1 MHz sideband, as it was in the original black-and-white receivers. Y, I and Q are related to R, G and B by a linear transformation. Y is a nonnegative weighted sum of the color components, but I and Q can be negative. Synchronous detection is made possible by including 8–11 waves of the subcarrier in each line of the scan. The precise frame rate and subcarrier frequency were chosen so that the chrominance components would be seen on old black-and-white receivers as a high spatial frequency "checkerboard" pattern.

Time domain partitioning: A full frame of approximately $\frac{1}{30}$ s contains 525 lines, which are interlaced into two half-frames. In the first half-frame, the lines start at the upper left and terminate at the lower right; in the next half-frame, they begin at the upper center and terminate at the lower center. A total of 21 lines are blanked during the vertical retraces, although closed-caption information is included within these lines. Each line is blanked for about 8% of its duration to allow for the horizontal retrace, and another 5% is allocated to the "color burst" (the 8–11 waves of subcarrier frequency mentioned above), used for synchronous detection. By design, there are exactly 455 half-waves of the subcarrier in one line. The 4.1 MHz bandwidth allows approximately 521 independent symbols per line, of which 450–460 are available for image data.

Signal voltage ranges: Expressed in terms of the percentage of unmodulated carrier amplitude, the signal corresponds to full brightness at 100% modulation (actually a little less to be certain to avoid overmodulation), and darkness at 25% modulation. Signals in the last 25% of the modulation range are referred to as "ultrablack", and are used to trigger retraces and blank the trace. Other factors: The aspect ratio of an NTSC image is 4:3 (for HDTV, a ratio of 16:9 is used). The relative bandwidths for Y, I and Q correspond to ratios of 8:3:1 in the numbers of these coefficients.

APPENDIX B, JPEG COMPRESSION: Although many compression schemes (such as wavelets) are available, the Joint Photographic Experts Method, or JPEG has been widely used because of its efficiency. MPEG, often used in satellite TV systems, is essentially an extension of JPEG that allows extra compression when successive frames either do not change or are transformations of the previous frame due to pan, tilt, and zoom. After transforming a color image into three components (which could be the ones described above or a similar system with luminance, hue, and saturation), the luminance image is partitioned into 8×8 blocks. The pixel at image location (i,j) is represented by integer data $y_{ij}$, usually a byte. Through experimentation it has been found that one very effective way to compress this data is to transform it first using a basis function of the form $$\cos\left(m\pi\frac{i+\frac{1}{2}}{8}\right)\cdot\cos\left(n\pi\frac{j+\frac{1}{2}}{8}\right) \quad 0\le i, j; m, n\le 7$$

The resulting coefficients $c_{mn}$ contain all the information of the $y_{ij}$'s, but their values tend to be largest for smaller values of m and n, at least for conventional "smooth" images. The dc component, $c_{00}$, is non-negative and generally larger in magnitude than the others, which can be either positive or negative. Their absolute values decrease approximately monotonically if they are arranged in the "zig-zag" order $c_{01}, c_{10}, c_{20}, c_{11}, c_{02}, c_{03}, \ldots c_{77}$.

Quantization of these coefficients based on the ability of the human visual system to detect spatial modes of different contrast and color makes the transformation noninvertible, or lossy, but can lead to a sparse sequence of small integers that is effectively encoded with very few bits. Quantization is based on the observation that a certain threshold of contrast change is necessary for human observers to detect differences in brightness for these patterns. The level of change needed for perceptible difference is greater with patterns with more stripes. These levels are expressed as an array of "quantization" values, which are used to break up the range of each transformation coefficient into a finite number of perceptible ranges. Once quantization has been performed, the transformation is no longer invertible, but the number of bits necessary to define the image has been reduced by a large factor. Quantization is the man reason for the huge compression obtained by DCT-based coding.

Since many of the quantized coefficients are zero, symbols for runs of zeros can be used instead of denoting each value. The dc component can be difference-encoded, entering only its difference from some prediction. This prediction could be complicated, or as simple as the previous dc value. When this sequence of symbols is determined, it can be entropy encoded by substituting variable length symbols, the shorter ones denoting more frequently encountered values ("Huffman coding"). The encoded string is interpreted, requantified, and inverse transformed to produce a suitable approximation of the original image.

Chrominance values are treated similarly, except that the reduced resolution of the human eye for color makes it possible to average I and Q over 2×2 squares without noticeable effect. Thus, the information for both of the color components takes only half as many bits as the luminance information. For most images, the number of bits needed for a color image is about equal to the number of pixels. APPENDIX C, DCT TRANSFORMATION: The transformation from image space to transform coefficients is presented for reference. A compact expression of the transformation uses a similarity transformation of a block of brightness values of each luminance or chrominance component:

$$\Psi = T'YT$$

where T' is the transpose of T, $\Psi$ is the 8×8 matrix of transform coefficients and Y is a block of luminance values:

$$\begin{bmatrix} Y_{00} & Y_{01} & Y_{02} & Y_{03} & Y_{04} & Y_{05} & Y_{06} & Y_{07} \\ Y_{10} & Y_{10} & Y_{12} & Y_{13} & Y_{14} & Y_{15} & Y_{16} & Y_{17} \\ Y_{20} & Y_{21} & Y_{22} & Y_{23} & Y_{24} & Y_{25} & Y_{26} & Y_{27} \\ Y_{30} & Y_{31} & Y_{32} & Y_{33} & Y_{34} & Y_{35} & Y_{36} & Y_{37} \\ Y_{40} & Y_{41} & Y_{42} & Y_{43} & Y_{44} & Y_{45} & Y_{46} & Y_{47} \\ Y_{50} & Y_{51} & Y_{52} & Y_{53} & Y_{54} & Y_{55} & Y_{56} & Y_{57} \\ Y_{60} & Y_{61} & Y_{62} & Y_{63} & Y_{64} & Y_{65} & Y_{66} & Y_{67} \\ Y_{70} & Y_{71} & Y_{72} & Y_{73} & Y_{74} & Y_{75} & Y_{76} & Y_{77} \end{bmatrix}$$

The subscripts are the row r and column c offsets from the (r,c) value at the upper left corner of the block. The unitary transformation matrix T is formed from only 8 (signed) values:

$$\begin{bmatrix} a_0 & a_1 & a_2 & a_3 & a_4 & a_5 & a_6 & a_7 \\ a_0 & a_3 & a_6 & -a_7 & -a_4 & -a_1 & -a_2 & -a_5 \\ a_0 & a_5 & -a_6 & -a_1 & -a_4 & a_7 & a_2 & a_3 \\ a_0 & a_7 & -a_2 & -a_5 & a_4 & a_3 & -a_6 & -a_1 \\ a_0 & -a_7 & -a_2 & a_5 & a_4 & -a_3 & -a_6 & a_1 \\ a_0 & -a_5 & -a_6 & a_1 & -a_4 & -a_7 & a_2 & -a_3 \\ a_0 & -a_3 & a_6 & a_7 & -a_4 & a_1 & -a_2 & a_5 \\ a_0 & -a_1 & a_2 & -a_3 & a_4 & -a_5 & a_6 & -a_7 \end{bmatrix}$$

where:

$$a_0 = 1/(2\sqrt{2})$$

$$a_j = (\tfrac{1}{2})\cos(j\pi/16), j \in [1, 7]$$

To define the notation, the similar equations for the chrominance components are $$\Psi = T'IT$$

$$\Theta = T'QT$$

The transformation is inverted by reversing the order of the T-matrices:

$$Y = T\Psi T'$$

$$I = T\Phi T'$$

$$Q = T\Theta T'$$

Note: If wavelets or some other basis were used instead of the DCT, a different linear transformation would produce an analogous set of coefficients.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for HDTV and NTSC compatible image processing comprising:

obtaining luminance and chrominance image data of a scene to be transmitted;

quantizing and digitally encoding the image data to form digital image data in HDTV transmission format having low-resolution terms and high-resolution terms;

transforming the low-resolution digital image data terms to a voltage signal corresponding to NTSC color subcarrier modulation with retrace blanking and color bursts added to form a NTSC video signal;

transmitting the NTSC video signal and the high-resolution digital image data terms in a composite NTSC video transmission;

in a NTSC receiver, processing the NTSC video signal directly to display the scene;

in a HDTV receiver, processing the NTSC video signal to invert the color subcarrier modulation to recover the low-resolution terms, combining the recovered low-resolution terms with the high-resolution terms, and reconstructing the scene in a high definition format.

2. The method of claim 1, further including selecting low-resolution terms, where the selected low-resolution terms have the properties that an image displayed on the NTSC receiver is a suitable presentation of the scene, that luminance and chrominance terms be in suitable proportion for NTSC video bandwidth, and that the terms be invertible for HDTV receivers.

3. The method of claim 2, where selecting low-resolution terms includes:

forming the HDTV transmission format as one-dimensional arrays of luminance and in-phase and quadrature chrominance data; and selecting the first, second, third, and fifth terms in the one-dimensional array of luminance data, the first six terms in the one-dimensional array of the in-phase chrominance data, and the first and third terms in the one-dimensional array of quadrature chrominance data.

4. The method of claim 3, wherein transforming the low-resolution digital image data further includes:

arranging the low-resolution terms in arrays of eight blocks containing 32 luminance terms within two macroblocks containing 12 in-phase chrominance components, and 4 quadrature chrominance components so that a traverse of the macroblocks encounters 8 luminance terms, 3 in-phase chrominance components, and one quadrature chrominance component, where the number of arrays provides for a NTSC image of 45×80 macroblocks in a 16:9 aspect ratio.

5. The method of claim 4, further including transforming each of the luminance, in-phase chrominance, and quadrature chrominance components to a voltage value and pulse modulating a NTSC signal carrier with the voltages.

6. The method of claim 1, where the NTSC video signal is formed by placing the high-resolution terms partly in lines of the NTSC video signal that do not contain the low-resolution digital image terms and partly in a vestigial sideband of a carrier signal for the NTSC video signal.

7. The method of claim 1, where processing the NTSC video signal in an HDTV receiver further includes:

sampling the composite NTSC video transmission to recover the low-resolution and high-resolution image data; and inverting the image data to form the scene image in the high definition format.

8. The method of claim 7, further includes:

sampling the composite NTSC video transmission to output a first signal in-phase with the NTSC video signal and a second signal in quadrature with the NTSC video signal;

inverting the first signal to recover low-resolution and first high resolution transform coefficients;

inverting the second signal to recover second high-resolution transform coefficients; and collating the low-resolution and high-resolution coefficients to form an array of coefficients in HDTV format.

9. A method for generating a video transmission signal compatible with both NTSC and HDTV receivers comprising:

obtaining luminance and chrominance image data of a scene to be transmitted;

quantizing and digitally encoding the image data to form digital image data in HDTV transmission format having low-resolution terms and high-resolution terms; and transforming the low-resolution digital image data terms to a voltage signal corresponding to NTSC color subcarrier modulation with retrace blanking and color bursts to form a NTSC video signal.

10. The method of claim 9, further including selecting low-resolution terms, where the selected low-resolution terms have the properties that an image displayed on a NTSC receiver is a suitable presentation of the scene, that luminance and chrominance terms be in suitable proportion for NTSC video bandwidth, and that the terms be invertible for HDTV receivers.

11. The method of claim 10, where selecting low-resolution terms includes:

forming the HDTV transmission format as one-dimensional arrays of luminance and in-phase and quadrature chrominance data; and selecting the first, second, third, and fifth terms in the one-dimensional array of luminance data, the first six terms in the one-dimensional array of the in-phase chrominance data, and the first and third terms in the one-dimensional array of quadrature chrominance data.

12. The method of claim 11, wherein transforming the low-resolution digital image data further includes:

arranging the low-resolution terms in arrays of eight blocks containing 32 luminance terms within two macroblocks containing 12 in-phase chrominance components, and 4 quadrature chrominance components so that a traverse of the macroblocks encounters 8 luminance terms, 3 in-phase chrominance components, and one quadrature chrominance component, where the number of arrays provides for a NTSC image of 45×80 macroblocks in a 16:9 aspect ratio.

13. The method of claim 12, further including transforming each of the luminance, in-phase chrominance, and quadrature chrominance components to a voltage value and pulse modulating a NTSC signal carrier with the voltages.

14. The method of claim 9, where the composite NTSC video signal is formed by placing the high-resolution terms partly in lines of the NTSC video signal that do not contain the low-resolution digital image terms and partly in a vestigial sideband of a carrier signal for the NTSC video signal.

* * * * *